(No Model.)  6 Sheets—Sheet 1.

J. J. BUSENBENZ.
TIME RECORDER.

No. 596,692.  Patented Jan. 4, 1898.

Fig. 1.

Witnesses:
Ray Hutchins.
Richard Spencer

Inventor:
Jacob J. Busenbenz
By Dyrenforth and Dyrenforth,
Attorneys.

(No Model.) 6 Sheets—Sheet 3.

J. J. BUSENBENZ.
TIME RECORDER.

No. 596,692. Patented Jan. 4, 1898.

Fig. 3.

Witnesses:
Ray Hutchins
Richard Spencer

Inventor:
Jacob J. Busenbenz,
By Dyrenforth & Dyrenforth,
Attorneys.

(No Model.) 6 Sheets—Sheet 4.

J. J. BUSENBENZ.
TIME RECORDER.

No. 596,692. Patented Jan. 4, 1898.

Witnesses:
Ray Hutchins
Richard Spencer

Inventor:
Jacob J. Busenbenz,
By Dyrenforth & Dyrenforth,
Attorneys.

(No Model.)　　　　　　　　　　　　　　6 Sheets—Sheet 5.
J. J. BUSENBENZ.
TIME RECORDER.

No. 596,692.　　　　　　　　Patented Jan. 4, 1898.

Witnesses:
Ray Hutchins
Richard Spencer

Inventor:
Jacob J. Busenbenz,
By Dyrenforth & Dyrenforth,
Attorneys.

(No Model.) 6 Sheets—Sheet 6.

J. J. BUSENBENZ.
TIME RECORDER.

No. 596,692. Patented Jan. 4, 1898.

Witnesses:
Ray Hutchins
Richard Spencer

Inventor:
Jacob J. Busenbenz
By Dyrenforth & Dyrenforth
Attorneys.

UNITED STATES PATENT OFFICE.

JACOB J. BUSENBENZ, OF CHICAGO, ILLINOIS, ASSIGNOR TO THE NATIONAL TIME RECORDER COMPANY, OF SAME PLACE.

TIME-RECORDER.

SPECIFICATION forming part of Letters Patent No. 596,692, dated January 4, 1898.

Application filed November 13, 1896. Serial No. 611,992. (No model.)

*To all whom it may concern:*

Be it known that I, JACOB J. BUSENBENZ, a citizen of the United States, residing at Chicago, in the county of Cook and State of Illinois, have invented a new and useful Improvement in Time-Recorders, of which the following is a specification.

My invention relates to an improvement in the class of devices now in quite common use in business houses and factories for recording the time of the arrival, departure, absence, and the like of employees, for recording the time of receiving and finishing orders for work, and for various other purposes concerning which it is desirable to have a time-record.

More particularly stated, my invention relates to the class of numbering time-recorders, meaning the kind with relation to which each employee is distinguished by a number and operates the device to cause it to record his number, together with the time of day, by printing the same upon a web of paper, card, or the like presented to the printing mechanism of the device.

The more salient feature of my improvement relates to the provision of one or more bars carrying numbers or other characters by which the employees are distinguished, the bar or bars being movable for adjustment with relation to the time-printing mechanism by the application of setting-keys, of which each employee is provided with one corresponding with his number or distinguishing character and adapted to set the bar or bars to bring that number or character thereon into desired relation to the time-printing mechanism.

Generally stated, my improved time-recorder involves the following construction: In a case for the mechanism is housed a clock-movement controlling printing mechanism for printing upon a web, card, or the like presented to it the hours and minutes in a day, which are caused to correspond with the time indicated by the clock. Adjacent to the printing mechanism are supported, movably, the numbered or otherwise-characterized bars to be adjusted, through the medium of a suitable key, to register a given number or character on the bar or bars (according to the particular key used by the employee) with the time denoted on the printing mechanism at which the application of the key is made.

My invention consists in the general construction of the novel features of my improved time-recorder; and it also consists in details of construction and combinations of parts, all as hereinafter more particularly described, and pointed out in the claims.

Referring to the accompanying drawings, Fig. 12, a top plan view of the concentric printing-rings, with a portion of their cover broken away to disclose them, the view also showing, mainly by dotted lines, the type-bars and a setting-key engaging them; Fig. 13, a broken view in elevation, partly sectional, of a friction detail; Fig. 14, a view in front elevation of the operating-handle and its lock, and Fig. 15 a view showing the same in side elevation.

A is the case, shown as formed with the lower section $A'$ wider from front to back and the upper correspondingly-narrower section $A^2$, with an offset $A^3$ between the two sections.

From opposite sides of the case A are shown to extend rectangular cases P and P', provided with angular slots $r$ extending inward from their faces, and provided in horizontal series numbered consecutively from left to right and affording pockets for the setting-keys S, hereinafter described.

Figure 11:
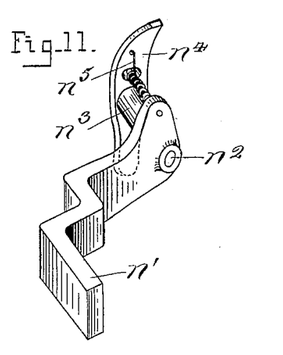
Fig. 11, a similar view of the paper-feeding pawl.

The lower section A' of the case is covered by a door $A^4$, shown as of the swinging variety and which supports the paper-carriage and the mechanism for actuating it. The paper-carriage B involves a frame composed of the two parallel side pieces $p$ and $p'$ and the face-plate $p^2$, at which the carriage is fastened upon the inner side of the door by means of screws $o$, passing through vertically-elongated slots, (not shown,) one of which is provided near each of the four corner portions of the face-plate. In the side $p$ of the carriage-frame is formed a vertically-elongated slot $n$, through which there projects laterally from the forward end portion of a bracket $n'$, Fig. 11, rigidly fastened to the inner side of the door $A^4$, a stud $n^2$, surrounded by a sleeve $n^3$, carrying at its inner end a pawl $n^4$, provided with a controlling-spring $n^5$. The pawl $n^4$ tends normally to engage a ratchet-wheel $m$ on the end of a shaft $m'$, journaled in the opposite sides of the carriage-frame and carrying a roll C for feeding the web C', as hereinafter described. Engaging with the ratchet-wheel $m$ in opposition to the pawl $n^4$ is a spring-controlled detent $m^2$, provided with a handle $m^3$, projecting outward through a slot $m^4$ in the side $p'$ of the carriage-frame.

Figures 12, 13, 14, 15:
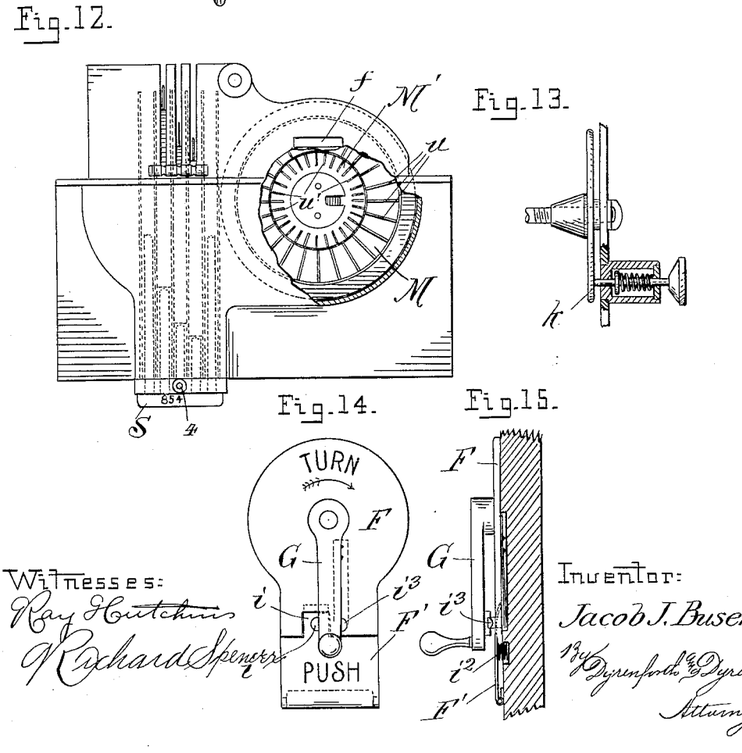

$C^2$ is the upper roll, carrying the web C', which is adjusted in place by leading it from the upper roll, about which it is wound, upward over guide-rollers $v'$ and $v$, journaled in the upper portion of the carriage-frame respectively near its front and rear, and thence down to the feed-roll C, to which it is fastened. To assist in maintaining the tension of the web C' between the two rolls, I engage with one of the heads of the upper roll a spring-controlled friction-stud $k$, the construction of which is most clearly shown in Fig. 13.

Figure 2:
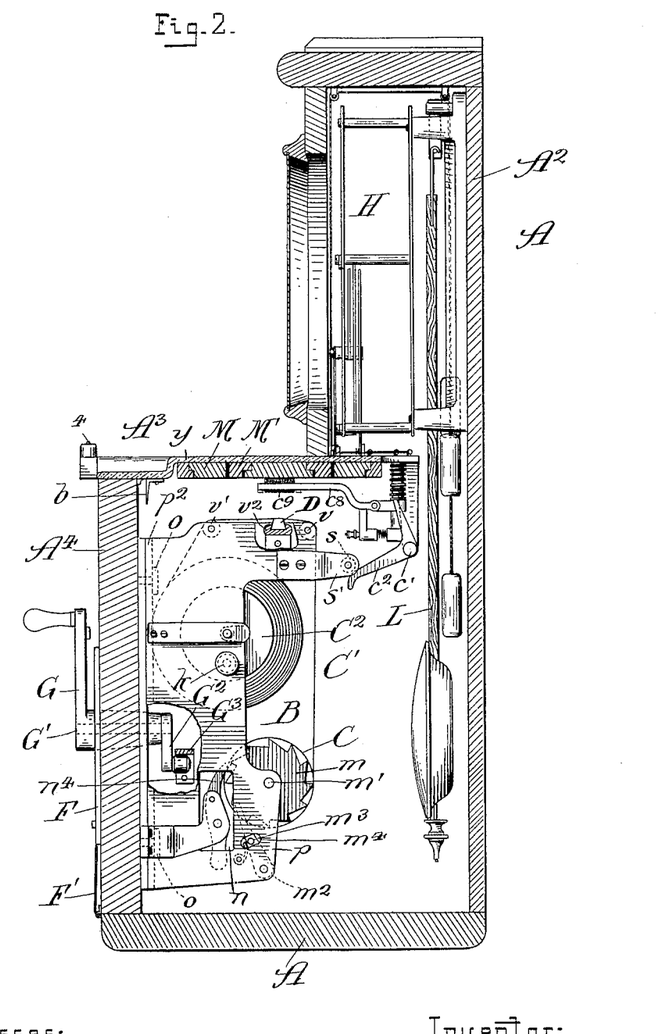
Fig. 2, a section taken at the line 2 on Fig. 3 and viewed in the direction of the arrow, with parts broken away to display details.

At the inner upper end of the carriage-frame there project inward from the sides $p$ and $p'$ bearings $s'$ for a roller $s$, only one of which bearings is shown in Fig. 2, owing to the nature of the view selected for illustration. It will be readily understood that the rod or roll $s$ extends from side to side of the frame.

On a bearing $v^2$, extending adjacent to the inner guide-roller $v$, between the sides $p$ and $p'$ of the carriage-frame, is supported an impression-pad D, which should be formed of yielding material or at least be yieldingly sustained.

F is a plate fastened upon the front or outer side of the door $A^4$ and having a lower section F', hinged at its lower edge and provided on its opposite edge with a tongue $i$, extending into a corresponding recess in the lower edge of the plate F and carrying a stud $i'$, and behind the section F' is confined a spring $i^2$, tending normally to push it outward. On the plate F, adjacent to the stud $i'$ is supported a spring-stud $i^3$.

G is a crank carried by a stem G', journaled in the door $A^4$ through the plate F, and carrying at its inner end a crank $G^2$, which engages a cross-bar $G^3$ from underneath, the cross-bar extending from side to side of the carriage-frame.

H is a clock-movement. That selected for use with my improved device is the ordinary eight-day Seth Thomas movement, which is too well known to require that it be described in this connection.

On the shaft $h$ is a sleeve $l$, held by friction thereon to rotate normally with the shaft. The sleeve $l$ carries a ratchet-wheel I, fastened in place through the medium of a split clamping-collar $l'$ on the face of the ratchet-wheel and adapted to be tightened about the sleeve $l$ through the medium of a set-screw $l^2$. For convenience in combining with the clock-movement my improved mechanism, as hereinafter described, for actuating the printing-wheels or printing-rings I place the minute spur-wheel $l^3$ of the clock-movement in front of the ratchet I to engage with the idler $l^4$ and the hour spur-wheel $l^5$ on the sleeve $l$ in front of the wheel $l^3$ to engage with the pinion $l^6$ on the idler $l^4$. The hour-hand T is loosely confined on the sleeve $l$ and the minute-hand T' is confined by friction on the sleeve. As will be seen by this arrangement of the hands, they may be set without affecting the mechanism of the clock-movement in setting. The ratchet-wheel I has by preference thirty teeth, and it carries on its inner rear side a pawl $h'$.

K and K' are levers fulcrumed at $x$ on a common axis, having its bearing in a bracket $H^2$, fastened to the clock-frame H'. The lever K is fulcrumed at $x$ to extend at the inner side of the front of the clock-frame. The lever K' is formed in one continuous length. At their upper ends the levers K and K' are provided, respectively, with the teeth $t$ and $t'$, the former extending into the path of the teeth of the ratchet-wheel I and the latter extending into the path of the pawl $h'$.

The top plate of the offset $A^3$ is extended inward into the case A nearly to its back, leaving only room enough for the action of the clock-pendulum L. A portion of the top plate is raised, as shown at $y$, to form a housing for the printing rings or wheels M and M'. These are rotatably supported concentrically, the latter within the former, by suitable bearings covered by the housing $w$. The wheel M has cast upon its under side type arranged radially at twenty-four equal intervals, denoting the hours of the day from "1" to "12" and from "1" to "12," with the "A. M." sign before each number of one set and the "P. M." sign before each number of the other set. On its upper side the printing-ring M carries radially at equal intervals apart twenty-four ribs $u$, Fig. 12. The printing-ring $M'$ has cast upon its under side in radial arrangement at equal intervals apart numbers beginning with "0 0," and thence progressing by twos—thus, "2," "4," "6," "8," &c., up to "58"—to designate two-minute intervals of time. On the upper side of the inner printing-wheel are arranged radially at equal intervals apart ribs $u'$, thirty in number, to correspond with the numbers on the under side.

In the plate $A^3$, in the section thereof which lies within the upper narrower portion of the case A and respectively in alinement with the lower ends of the levers K and $K'$, are elongated slots $g$ and $f$, respectively covered by the free ends of flat springs $g'$ and $f'$. The spring $g'$ carries on its upper side at its free end a cam $g^2$ and on its under side to the right of the cam a detent $g^3$, extending through a slot $g$ into the path of the ribs $u'$ on the inner type-wheel. The spring $f'$ carries on its upper side at its free end a cam $f^2$ and on its under side to the right of the cam a detent $f^3$, extending through the slot $f$ into the path of the ribs $u$ on the outer type-wheel.

The lever K carries at its lower end pivotally a pawl $e$, which projects through the slot $g$ and is resiliently held by a spring $e'$ in position to engage at its forward end with the teeth or ribs $u'$ on the inner type-wheel, and a similar spring $e^2$ is connected with the lever K below its fulcrum to tend to pull it in the direction of engaging the pawl with the ribs in opposition to the action of the teeth of the ratchet-wheel I against the tooth $t$ at the upper end of the lever. Near the lower end of the lever K is an outwardly-projecting pin $e^3$, engaging the upper side of the cam $g^2$.

The lever $K'$ carries at its lower end pivotally a pawl $d$, which projects through the slot $f$ and is resiliently held in position to engage at its forward end with the teeth or ribs $u$ on the outer type-wheel by a spring $d'$, and a similar spring (like the spring $e^2$, but not shown) is engaged with the lever $K'$ below its fulcrum to tend to pull it in the direction of engaging the pawl $d$ with the teeth in opposition to the action of the tooth $h'$ against the tooth $t'$ at the upper end of the lever.

Figure 10:
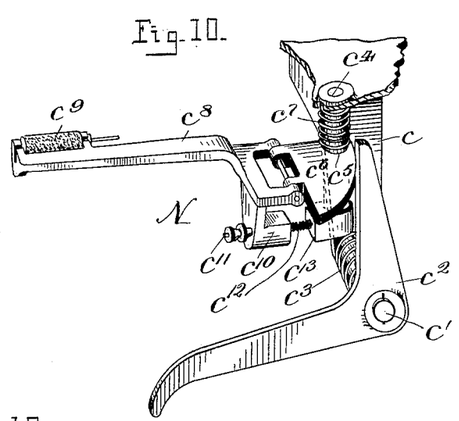
Fig. 10, a broken perspective view of the inking attachment for the printing mechanism.

N is the inking attachment, Fig. 10. On the lower end of a bracket $c$, depending rigidly from the inner portion of the plate $A^3$, is a rod $c'$, extending transversely of the bracket and having fulcrumed upon its end a bell-crank lever $c^2$, the lower forward projecting arm of which is slightly curved in a downward direction, and a spring $c^3$ on the rod engages the bell-crank to tend to return it to its normal position when turned therefrom. Adjacent to the bracket $c$ there depends a pin $c^4$, having rotatably confined upon it a sleeve $c^5$, carrying a head $c^6$, and surrounded by a spring $c^7$, tending to return the sleeve to its normal position when turned therefrom. The head $c^6$ has hinged to it to yield upward and downward a bent lever $c^8$, carrying, to rotate in suitable bearings near its outer end, an inking-roller $c^9$, shown to be provided with a handle at one end to afford means by which to manipulate it in placing it in position. The inking-roller should be of the variety which retains the ink with which it is saturated and does not require frequent renewal. From the hinged end of the lever $c^8$ there depends a bearing $c^{10}$ for a set-screw $c^{11}$, secured at its inner end to a head $c^{13}$ on the lower end of the sleeve $c^5$, and between the head $c^{13}$ and the bearing $c^{10}$ there is confined about the set-screw a spring $c^{12}$, tending to force the lever $c^8$ yieldingly upward.

From the foregoing description of the mechanism of the inking attachment it will readily be seen that it is actuated by depressing the forward projecting arm of the bell-crank $c^2$, owing to the engagement of the other arm with the head $c^6$ to turn the sleeve $c^5$ toward the left and thereby sweep the lever $c^8$ and the inking-roller $c^9$ across the face of the wheels M and $M'$, as also across the type-bars, hereinafter described, and thus across the face of the type in the path of the inking-roller, and that on releasing the bell-crank the spring $c^7$ returns the arm $c^8$ and with it the roller $c^9$ to their normal positions. In returning the arm $c^8$ encounters a cam O in its path, (see Fig. 4,) whereby the inking-roller $c^9$ is forced and normally maintained, against the resistance of the spring $c^{12}$, out of contact with the outer type-wheel to avoid obstructing its movement.

In the raised part of the table $A^3$ and extending inward from its front edge and parallel with each other adjacent to the type-wheels are the guideways $w$, $w'$, $w^2$, $w^3$, and $w^4$. In the guideways $w'$, $w^2$, and $w^3$ are confined, to be longitudinally movable therein, the type-bars R, $R'$, and $R^2$, each having fastened to its rear end a cord $q$, passing over a lower guide-pulley $q'$, Fig. 5, and thence over an upper guide-pulley $q^2$, Fig. 3, and carrying on its depending end a weight $q^3$, the purpose of the weights being to return the type-bars to their normal positions after having been forced inward, in the manner hereinafter described, and thereupon released. Of course, however, suitably-arranged spring mechanism may be substituted for the weights to serve their purpose. Each type-bar carries on its under side, at equal intervals apart, the same on each bar, number-types, each series of numbers being from "0" to "9."

Figure 6:
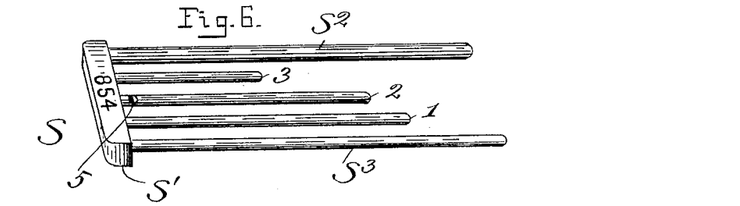
Fig. 6, a perspective view of a setting-key.

As will be seen, by forcing the type-bars longitudinally inward numerals on them or upon any number of them may be brought into transverse alinement with each other, as also into alinement with a radial series of the figures on the type-wheels. Inspection of Fig. 4 will show that the characters which have thus been brought into alinement with each other are the following: "854 P. M. 12 0 0," meaning that the employee distinguished by the number "854" came in or presented himself at noon. This arrangement of the characters on the type-bars with relation to the time indicated on the printing-wheels is produced by the use of a key S, the preferred form of which is that best illustrated in Fig. 6. From a head S' there extend parallel with each other the outer rods S² and S³, which may be of the cylindrical form in cross-section illustrated and of equal length or of other form and differential length, though their diameters should differentiate for a purpose hereinafter described. Between the outer rods S² S³ there extend from the head S' parallel with each other the rods 1, 2, and 3, of such relative lengths on each setting-key as may be required for pushing inward the type-bars the relative distances to bring the same number as that of the key, and which should be marked on the head S' thereof, into alinement on the type-bars with a radial series of characters on the type-wheels.

There being three type-bars provided in the device, as shown in the drawings, the largest number that may be denoted by them is "999," so that the device could not be used for recording the time of a greater number of employees. It is true that the cases P and P', as shown, contain only one hundred and twenty pockets, which would indicate that the device is intended for use with only that number of keys representing the same number of employees; but it would have been impossible to show a greater number of pockets to correspond with the numbering capacity of the device without representing them upon an unduly small scale.

From the foregoing it will be understood that with the device arranged for less than a hundred employees up to ninety-nine there need be only two of the intermediate keyrods provided, while for a number of employees represented by four figures, five figures, &c., for each additional figure another intermediate rod might be provided and also another type-bar. In practice, however, it is found most convenient to provide the device for use by no greater number of employees than one hundred and to increase the number of the devices employed by one for each one hundred employees in an establishment. Obviously when an employee is characterized by a number represented by a single figure his key would require only one intermediate rod for moving one type-bar, and an employee whose number is represented by two figures would require a key having only two intermediate bars of differential length for moving two type-bars. At the same time it is preferred to provide each key for a given time-recorder with the same number of intermediate rods and to make those not required in the individual cases for moving one or more of the type-bars so short as not to operate against the latter, but merely to enter the mouths of the openings leading to the type-bars and serve as guides for the keys.

The operation of my improved time-recorder is as follows: To enable the door A⁴ to be closed, the carriage B thereon must be in its lowest position to avoid obstruction against closing by a pendent hook b, near the center of the front of the under side of the plate A³. This position, however, it does not occupy with the operating-handle G in its normal perpendicular position, (shown in Fig. 1,) since then the crank G² is slightly below its highest position of engagement with the cross-bar G³, whereby the carriage is accordingly raised and the upper edge of the plate $p^2$ passes behind the hook b, which affords a stop against opening the door while the carriage is raised. To enable the door to be closed, the handle G must extend across the point marked a on Fig. 1, where the crank G² is in its lowest position, with its top on a plane below that of the lower end of the hook b. With the door once closed and locked through the keyhole represented at a', it is not intended to be again opened, except by the person or persons authorized to open it to remove the record printed on the web C', as hereinafter described, and readjust or renew the web. After the closure the handle G is turned in the direction indicated by the arrow on the plate F until it snaps over the spring-stud $i^3$ against the stop i', and is thus confined or locked between the two. In turning the handle toward the last-named (its normal) position it correspondingly turns the crank G' to engage the cross-bar G³ and accordingly raises the carriage until the handle reaches the position of crossing the point marked at $a^2$ on the plate F in Fig. 1, from which point, in turning the handle to its locked position, the crank G² is turned slightly beyond its highest position and allows the carriage to drop slightly by its own gravity.

Figure 1:
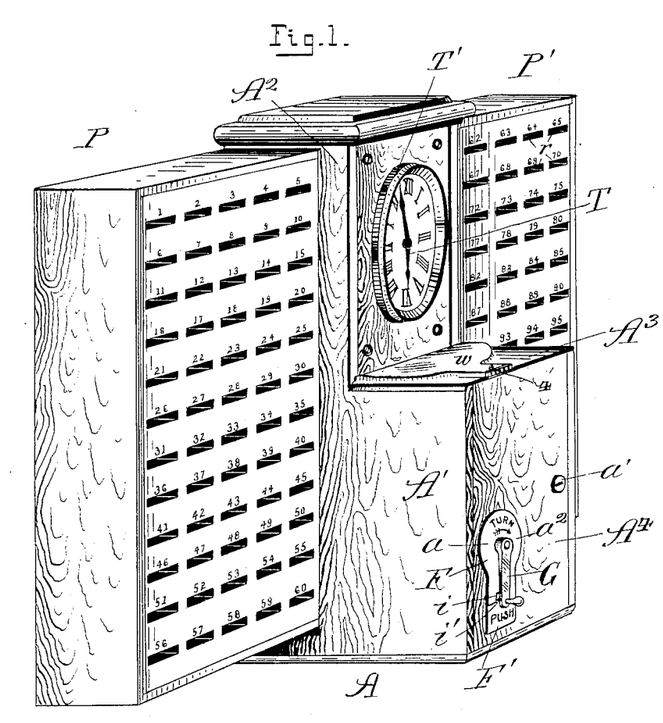
Figure 1 is a perspective view of my improved time-recorder.
Figures 4, 5:
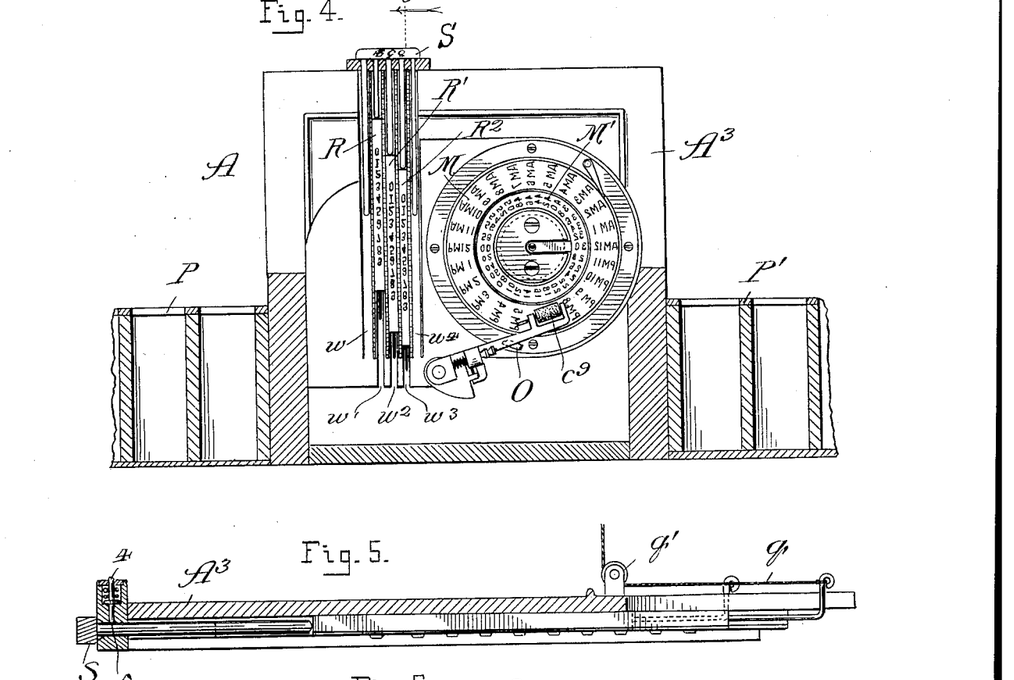
Fig. 4, a broken view, in horizontal section, showing a bottom plan view of the concentric printing-rings and movable type-bars, with a setting-key operatively engaged with the latter.
Fig. 5, a section taken at the line 5 on Fig. 4, viewed in the direction of the arrow and enlarged.

With the door A⁴ closed and the operating-handle locked, as shown in Fig. 1, the device is in readiness for use, as follows: Each employee, prior to actuating the device to record his time, selects from a pocket r the key S, corresponding with the number by which he is characterized, and inserts it into the guideways, as shown in Fig. 4. By having one of the rods S² S³ thicker than the other, when, of course, the opening or guideway to receive the thicker rod is accordingly of the greater diameter, the key cannot be inserted upside down. By thus inserting the key the intermediate rods thereof adjust the type-bars relatively by forcing them differentially inward, according to the differential lengths of the intermediate rods, to register the number of the key across the type-bars with a radial series of characters on the type-wheels corresponding with the time of the operation. The key is yieldingly held in its inserted position against accidental displacement by a spring-stud 4, Fig. 5, engaging a recess 5 in one of the intermediate rods of the key. After inserting the key S as and with the effect described the operator presses the plate-section F' (marked "Push" on Fig. 1) to release the handle G from the stop $i'$, when the weight of the carriage B causes it to drop to its lowest position, and in so dropping it turns the operating-handle (by bearing against the crank $G^2$) until it reaches the position of extending across the point $a$. Of course, however, the operator may, if he desires, both press the section F' and manipulate the handle with one hand to control this drop of the carriage. In the drop of the carriage a tooth of the ratchet-wheel $m$ on the feed-roll C, engaged by the pawl $n^4$, bears against the latter and thereby turns the ratchet-wheel the extent of one tooth and with it the roll C—say to the extent of about one-half an inch. The operator continues to turn the handle G toward the right, thereby raising the carriage and bringing the impression-pad D, which is always in vertical alinement with the alining series of type on the type-bars and type-wheels, against the latter with the interposed section of the web C', whereby the time at which the employee inserted the key, as well as his number, are printed on the web. By continuing to turn the operating-handle past the point $a^2$ to its locked position and thereby raising the carriage the working end of the pawl $n^4$ is in the path of the serrated periphery of the ratchet-wheel $m$, whereby when the latter in rising passes the pawl and a tooth of the wheel engages the pawl until it passes the latter, when the pawl springs into the notch below the tooth to engage it when the carriage is again lowered. This lowering takes place, to a very slight extent, soon after the handle passes the point $a^2$ until it reaches its locked perpendicular position, since then the crank $G^2$ has passed its highest point in engagement with the cross-bar $G^3$, and in this slight dropping of the carriage the roll is also slightly turned by engagement of the ratchet $m$ with the pawl $n^4$ and feeds the web accordingly, though the only purpose of this very slight drop of the carriage is to withdraw the web away from the face of the type to avoid interference with the movement of the type-wheels and type-bars. In each drop of the carriage B with the movement of the operating-handle from its perpendicular locked position to that of crossing the point $a$ the rod $s$, which is permanently above the forward projecting arm of the bell-crank $c^2$ when the door is closed, drops against that arm, thereby depressing it and swinging the lever $c^8$ with the inking-roller $c^9$ across the face of the type in the path of the roller to ink the type. With the subsequent rise of the feed-roller carriage the bell-crank is released, thereby releasing the lever $c^8$ and permitting the spring $c^7$ to return it to its normal position and carry with it the roller $c^9$.

The outer type-ring M is caused to make one complete revolution in each twenty-four hours and the inner type-ring M' is caused to make one complete revolution every hour. This is produced by the action of the clock-movement on the ratchet-wheel I, carrying the tooth $h'$. Thus the ratchet-wheel is turned the extent of one of its thirty teeth every two minutes, and in turning it forces the lever K at its tooth $t$ backward on its fulcrum until the ratchet-tooth passes the lever-tooth, meantime forcing the lower end of the lever in the contrary direction to withdraw the pawl $e$, carried by it from engagement with the rib or tooth $u'$ on the upper side of the inner type-wheel and permit the spring $g'$ to rise and lift out of the path of a rib $u'$ the detent $g^3$. As soon as the ratchet-tooth passes the lever-tooth $t$ the lever is snapped back by the recoil of its spring $e^2$ to bring its tooth into engagement with the next succeeding tooth of the ratchet-wheel I, and consequent movement of the opposite end of the lever in the contrary direction forces the pawl $e$ against the next succeeding rib $u'$ on the inner type-wheel, thereby turning the latter the extent of one rib and also the extent of the space between two numbers on its under side, while the pin $e^3$ depresses the cam $g^2$ through the slot $g$ into engagement with a rib $u'$. In this manner at the end of each two minutes of time type on the inner wheel M' denoting the minute in the hour is brought into alinement with the impression-pad D.

Once in each revolution of the wheel I the tooth $h'$ encounters the tooth $t'$ on the lever K', thereby in the manner described of the action of the lever K withdrawing the pawl $d$ on the lower end from engagement with a rib $u$ on the outer type-wheel M and permitting the spring $f'$ with its detent $f^3$ to rise until the tooth $h'$ passes the lever-tooth, when the recoil of the lever-spring $d^2$ snaps the pawl against the next succeeding rib $u$ to turn the wheel M the extent of one space between adjacent type-lines thereon and force the spring $f'$ down by engagement of the pin $d^3$ with the cam $f^2$ to bring the detent $f^3$ into the path of the ribs $u$. In this manner the hour of the day, denoted by the type on the under side of the outer type-ring M, is brought into vertical alinement with the impression-pad and into longitudinal alinement with the minute of the day to which the hour relates and with the number of the employee who has inserted his key S, so that in turning the operating-handle G at any time, after the insertion of a key, the time of the insertion, together with the number of the employee making it, will be recorded on the web C'.

Figure 3:
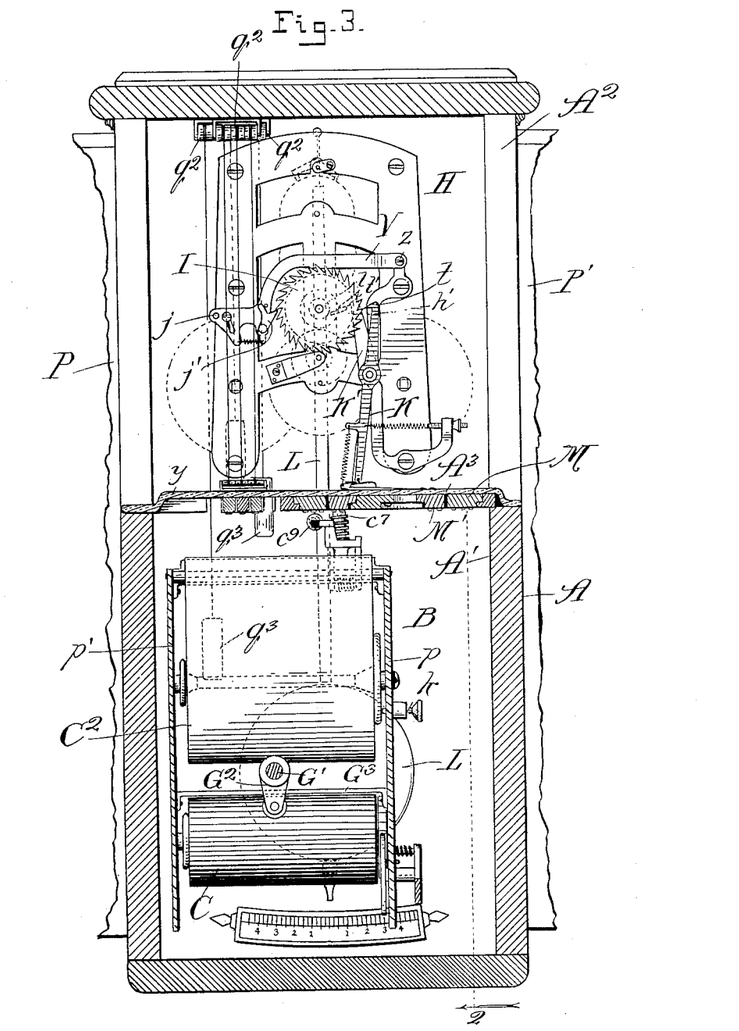
Fig. 3, a broken view presenting the mechanism of the device in front elevation, the front of the inclosing case being removed to disclose the mechanism.
Figures 7, 8, 9:
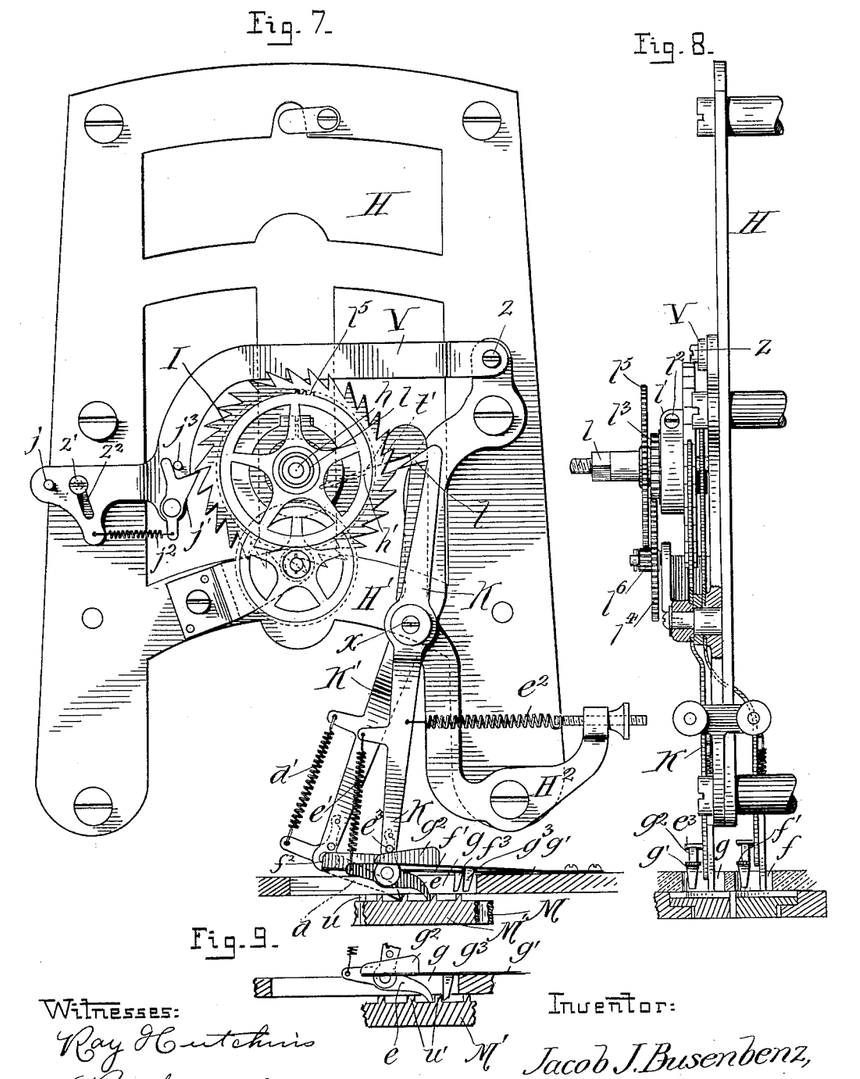
Fig. 7, a broken view, in front elevation, partly sectional, showing the printing-rings, with the mechanism for operating them, under the control of a clock-movement.
Fig. 8, a broken view, in side elevation, partly sectional, of the mechanism illustrated in Fig. 7.
Fig. 9, a broken sectional view showing the minute-printing ring, its actuating-pawl, and detent, with the parts in the relative positions occupied by them after the ring has been turned.

Means for simultaneously setting the hands of the clock and the type-wheels are shown in Figs. 3 and 7. V is a lever fulcrumed at $z$ at one side of the clock-frame and extending thence to the opposite side thereof, where it is confined by a pin $z'$, extending through a slot $z^2$ in the free-end portion of the lever, which should be bent, as shown. Near the extremity of the free end of the lever there projects forward therefrom a pin $j$, which passes through a slot in the clock-dial adjacent the numeral "IX" thereon. This slot is not shown in Fig. 1 of the drawings, as the perspective nature of the view hides it. On the lever V there is pivoted a pawl $j'$ to engage with the teeth of the ratchet-wheel I under the control of a spring $j^2$, and the movement of the pawl is limited by a stop $j^3$. By working the lever V up and down at the handle $j$ the ratchet I is turned the extent of one tooth with each up-and-down movement of the lever, thereby correspondingly working the lever K, and also working the lever K' once in each complete revolution of the ratchet-wheel, and, owing to the frictional engagement of the hour and minute hands with the ratchet-wheel, turning the latter correspondingly sets the hands.

The somewhat complicated nature of the mechanism involved in my improved time-recorder has necessitated the foregoing minute description of the details of its construction to enable it and the operation to be comprehended by those skilled in the art to which my improvement relates. I do not wish to be understood, however, as desiring to limit my invention to such details of construction, but intend that the scope of the appended claims shall be in accordance with the terms in which they are expressed with regard to the prior art. For example, the construction and form of the key S may be variously modified without departure from my invention to adapt it for use with movable type-bars varied from the form and construction thereof herein shown and described. Moreover, the movable type-bar feature of my invention is not limited for use in connection with the particular kind of time-printing mechanism shown and described, nor with a paper-feeding carriage, or with such a carriage adapted to be moved up and down with relation to the printing mechanism.

What I claim as new, and desire to secure by Letters Patent, is—

1. In a time-recorder, the combination of a clock-movement, rotatable concentric printing-rings, a ratchet-wheel connected with said clock mechanism and carrying a tooth, spring-controlled levers engaging said wheel and tooth, spring-controlled pawls on said levers engaging ribs on the printing-rings, guideways adjacent to said printing-rings, type-bars reciprocably confined in said guideways, a setting-key for moving said type-bars, a carriage carrying paper-feeding mechanism and movable up and down with relation to said printing-rings and type-bars, and a handle connected with said carriage to operate it, substantially as described.

2. In a time-recorder, the combination with the inclosing case of a clock-movement carrying a ratchet-wheel I provided with a tooth $h'$, horizontally-disposed rotatable printing-rings M and M', levers K and K' fulcrumed to engage at their upper sides respectively with said ratchet-wheel and tooth and at their lower ends with said printing-rings, the hands of the clock confined in place by friction to be moved at will independently of the clock-movement, by turning said ratchet-wheel, and a lever V having an operating-handle and carrying a pawl $j'$ in engagement with the ratchet-wheel to turn it by operating said lever, substantially as and for the purpose set forth.

3. In a time-recorder, the combination of an inclosing case having an offset $A^3$, a clock-movement supported in the upper part of the case, rotatable concentric printing-rings M and M' supported in said offset, a ratchet-wheel I connected with said clock mechanism and carrying a tooth $h'$, spring-controlled levers K and K' having teeth at their upper ends respectively engaging the ratchet-wheel teeth and the tooth $h'$, spring-controlled pawls on the lower ends of said levers respectively engaging ribs $u'$ and $u$ on the upper sides of said printing-rings, springs $g'$ and $f'$, covering openings in said offset through which said pawls work and carrying on their lower sides detents $g^3$ and $f^3$ and on their upper sides cams $g^2$ and $f^2$ engaged by projections on said levers, guideways in said offset adjacent to said printing-rings, key-set type-bars reciprocably confined in said guideways, a carriage in the lower part of said case carrying paper-feeding mechanism and movable up and down with relation to said printing-rings and type-bars, and a handle connected with said carriage to operate it, substantially as described.

JACOB J. BUSENBENZ.

In presence of—
J. H. LEE,
R. T. SPENCER.